United States Patent [19]

Spencer et al.

[11] Patent Number: 5,639,111
[45] Date of Patent: Jun. 17, 1997

[54] AIR BAG MODULE

[75] Inventors: Graham Thornton Spencer, Tipp City; Michael William Brookey, New Carlisle; Mark Thomas Winters, Troy, all of Ohio

[73] Assignee: General Motors Corporation, Detroit, Mich.

[21] Appl. No.: 550,513

[22] Filed: Oct. 30, 1995

Related U.S. Application Data

[63] Continuation-in-part of Ser. No. 413,851, Mar. 29, 1995, abandoned.

[51] Int. Cl.$^6$ .................................................. B60R 21/20
[52] U.S. Cl. ........................................ 280/728.2; 280/730.2
[58] Field of Search ............................... 280/728.2, 728.3, 280/730.2, 730.1, 732, 731, 736, 741, 728.1, 743.1

[56] References Cited

U.S. PATENT DOCUMENTS

| | | | |
|---|---|---|---|
| 5,058,919 | 10/1991 | Paquette et al. | 280/728.2 |
| 5,261,692 | 11/1993 | Kneip et al. | 280/728.2 |
| 5,261,693 | 11/1993 | Krickl et al. | 280/728.3 |
| 5,263,739 | 11/1993 | Webber et al. | 280/728.2 |
| 5,351,987 | 10/1994 | Donegan et al. | 280/728.2 |
| 5,435,596 | 7/1995 | Rose et al. | 280/728.2 |

FOREIGN PATENT DOCUMENTS

| | | |
|---|---|---|
| 620140 | 10/1994 | European Pat. Off. . |
| 680851 | 11/1995 | European Pat. Off. . |
| 94/25313 | 11/1994 | WIPO ................. 280/728.2 |
| WO95/15871 | 6/1995 | WIPO . |

*Primary Examiner*—Eric D. Culbreth
*Assistant Examiner*—Peter C. English
*Attorney, Agent, or Firm*—Kathryn A. Marra

[57] ABSTRACT

According to the invention, an air bag module includes a frame of channel-shape cross section and a box shaped cover of molded plastic construction which encloses a folded air bag. The box-shaped cover is slid between the side walls of the frame and first and second interfitting slide locking features are provided respectively on the frame and the cover to interlock the cover to the frame. A cylindrical inflator is installed into the frame and cover. A retainer strap encompasses the frame and the cover to restrain the relative longitudinal movement therebetween so that the frame and cover are effectively attached together. The retainer strap also has at least one apertured end flap which overlies an end of the inflator, and a fastener is installed between the end flap aperture and the inflator to attach the inflator to the frame and the cover.

13 Claims, 9 Drawing Sheets

AIR BAG MODULE

REFERENCE TO RELATED APPLICATION

This is a continuation-in-part of U.S. patent application Ser. No. 08/413,851, filed Mar. 29, 1995.

The invention relates to an air bag module and more particularly, to a simplified air bag module in which a frame, cover and inflator are retained together by a retainer strap.

BACKGROUND OF THE INVENTION

It is well known in motor vehicles to employ an inflatable air bag to restrain an occupant.

Air bags are commonly manufactured as a module sub-assembly for ready installation into the vehicle. The air bag module may be mounted on the instrument panel, the seat, the door or other locations within the vehicle. Air bag modules have traditionally employed a sizable metallic housing in which the inflatable air bag and an associated inflator are housed. The present invention proposes a simplified air bag module assembly which is particularly suited for use in a seat or door.

SUMMARY OF THE INVENTION

According to the invention, an air bag module includes a frame of channel-shape cross section and a box shaped cover of molded plastic construction which encloses a folded air bag. The box-shaped cover is slid between the side walls of the frame and first and second interfitting slide locking features are provided respectively on the frame and the cover to interlock the cover to the frame. A cylindrical inflator is installed into the frame and cover. A retainer strap encompasses the frame and the cover to restrain the relative longitudinal movement therebetween so that the frame and cover are effectively attached together. The retainer strap also has at least one apertured end flap which overlies an end of the inflator, and a fastener is installed between the end flap aperture and the inflator to attach the inflator to the frame and the cover.

In one version of the invention, the side walls of the frame have longitudinal extending grooves formed on the outside to seat the strap walls of the retainer and simultaneously form a shoulder on the inside of the frame which defines the slide locking feature of the frame.

In another version of the invention, the retainer strap has a base end which is apertured to fit over one end of the inflator and laterally spaced strap walls which extend longitudinally from the base end to a pair of apertured end flaps which overlap one another and are apertured to receive a fastener installed to the other end of the inflator.

DESCRIPTION OF THE PREFERRED EMBODIMENT

Figure 1:
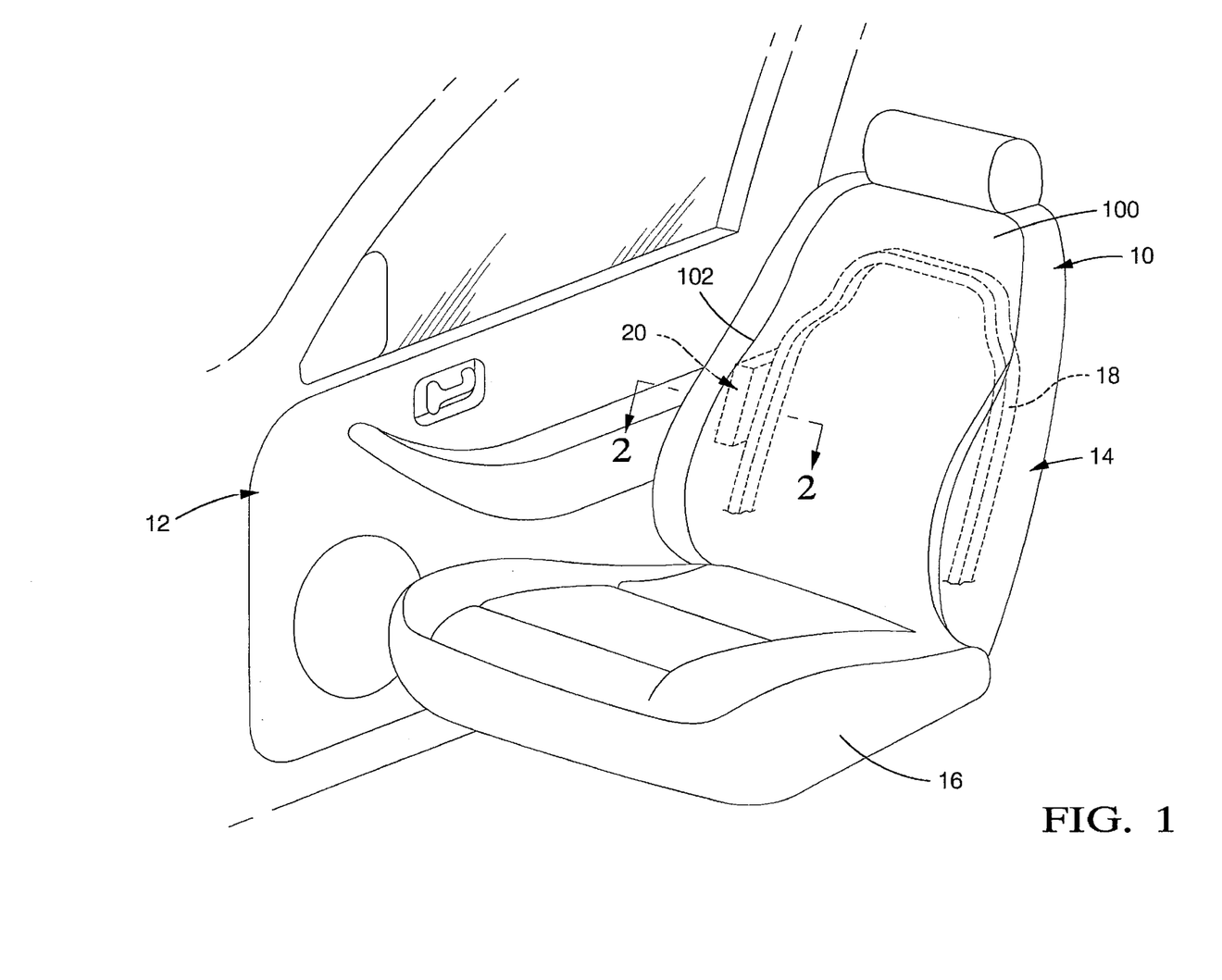
FIG. 1 is a perspective view showing a vehicle seat having an air bag module according to the invention.

Referring to FIG. 1, it is seen that a vehicle seat 10 is located in a vehicle body adjacent door 12 and includes a seat back 14 and a seat bottom 16. The seat back 14 includes a seat frame 18 on which an air bag module 20 is mounted.

Figure 2:
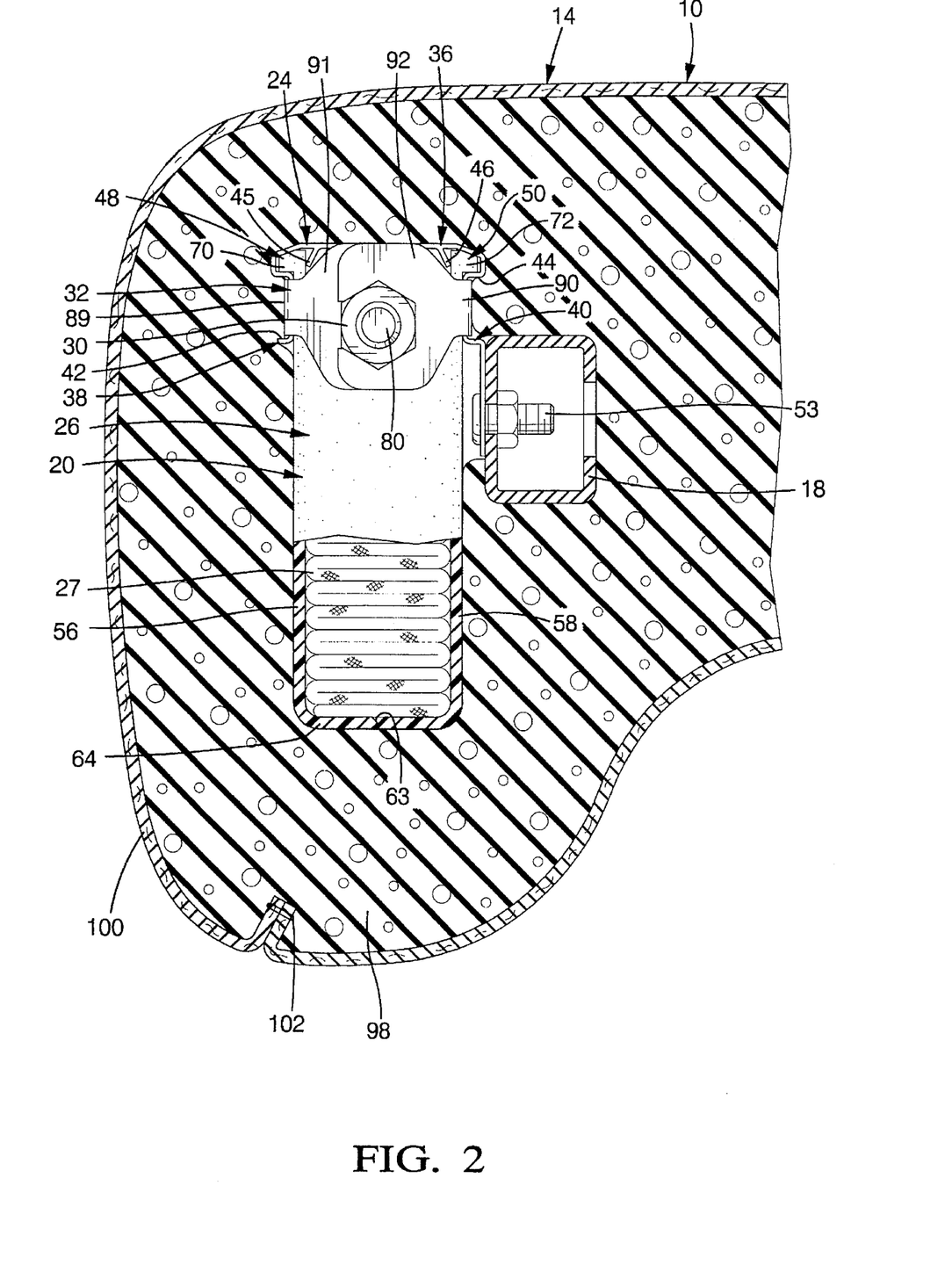
FIG. 2 is a section view taken in the direction of arrows 2—2 of FIG. 1.
Figure 5:
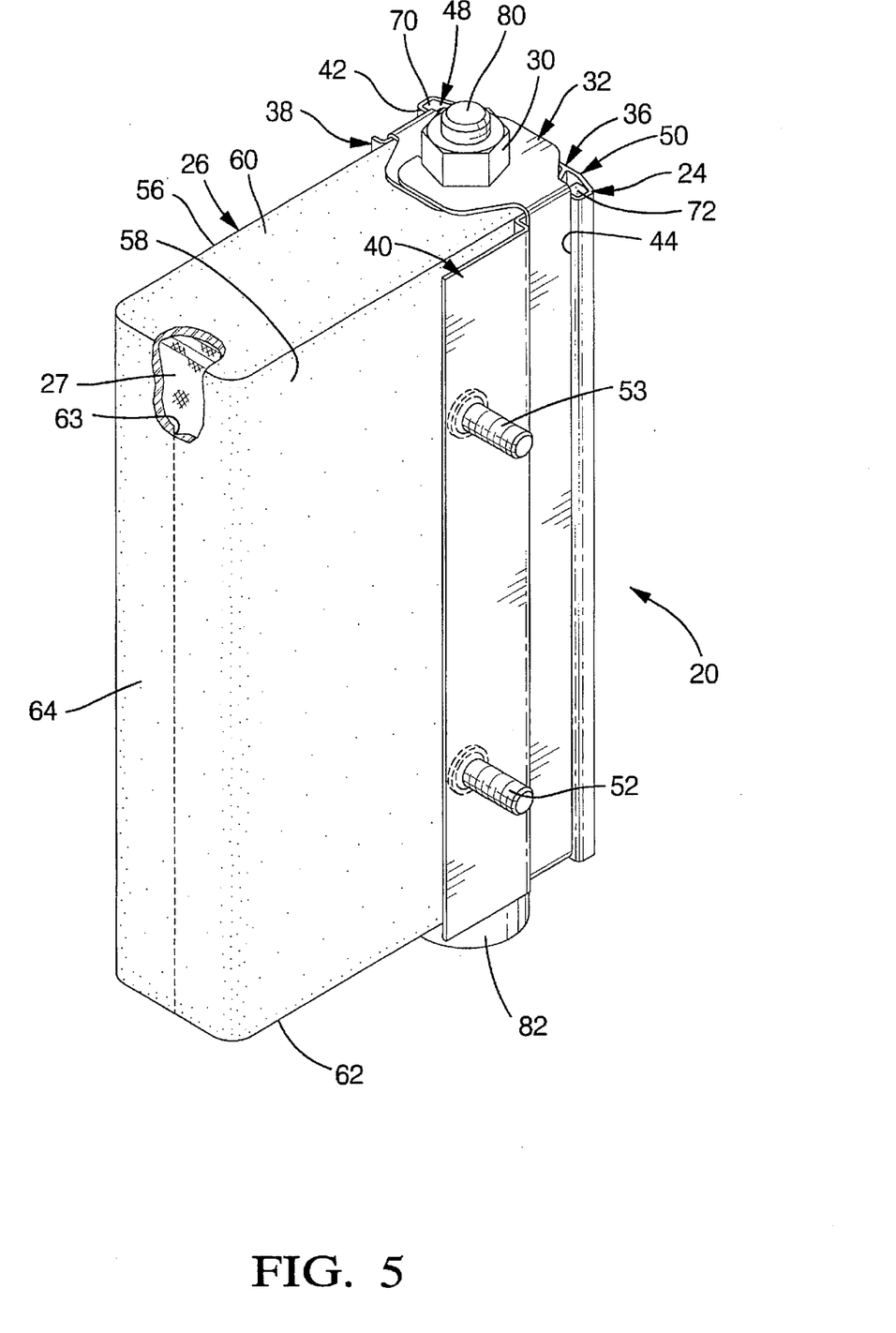
FIG. 5 is a perspective view of the air bag module of this invention.
Figure 6:
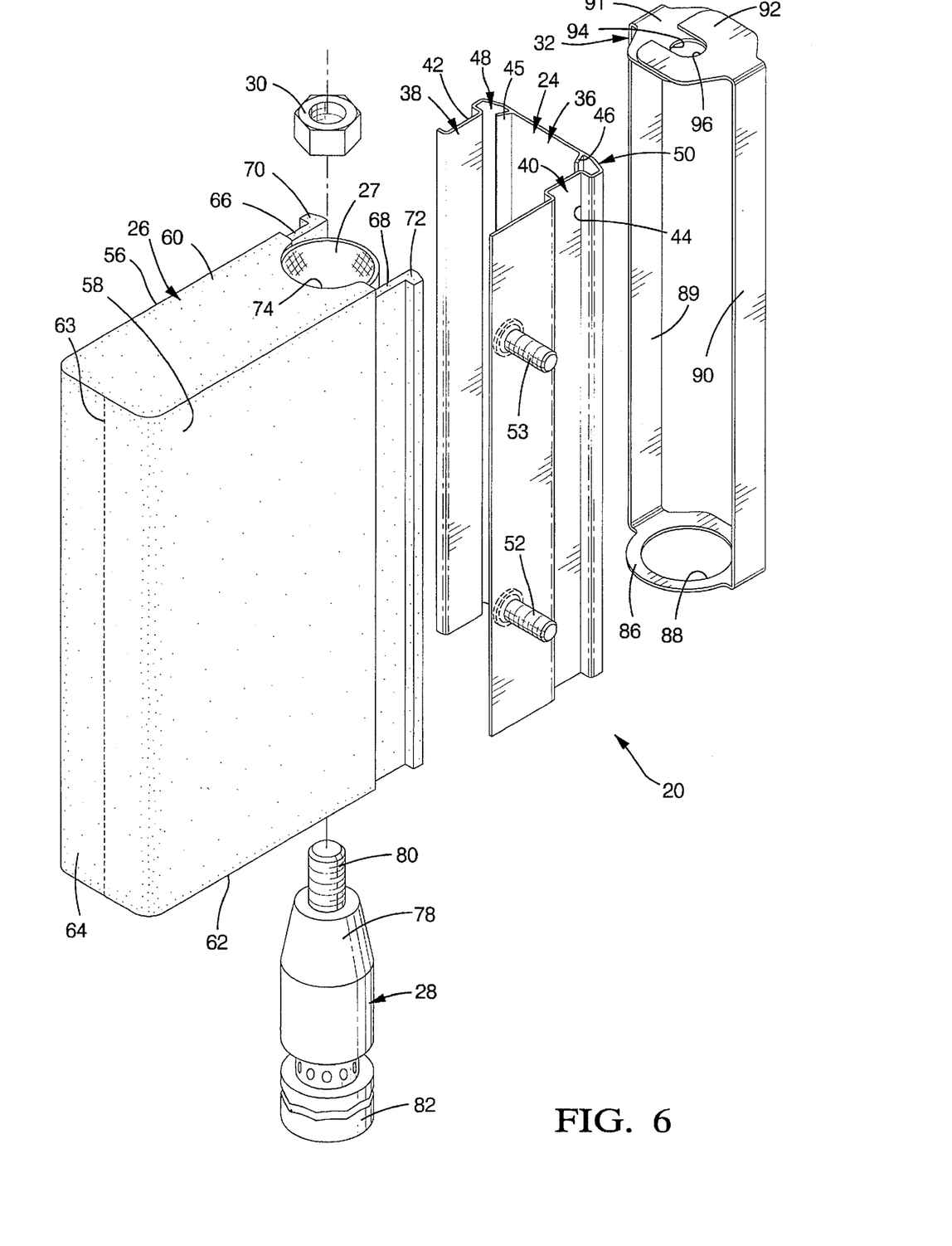
FIG. 6 is an exploded perspective view of the air bag module.

As best seen in FIGS. 2, 5 and 6 the air bag module 20 is comprised of a frame 24, cover housing 26, inflator 28, nut 30 and retainer strap 32.

Frame 24 is an extruded channel-shape including a base wall 36 and laterally spaced apart side walls 38 and 40. Side walls 38 and 40 have longitudinal extending recessed grooves 42 and 44 which cooperate with integral flanges 45 and 46 on the base wall side 36 to define slide locking features 48 and 50. The side wall 40 carries a pair of threaded studs 53 and 52 which enable attachment of the frame 24 to the seat frame 18 as shown in FIG. 2. The frame 24 is of extruded construction and can be of aluminum, plastic or other suitable strength material.

The cover 26 is a molded plastic box shape including side walls 56 and 58, top end wall 60, bottom end wall 62 and a break-apart wall 64. As seen in FIG. 2, the break-apart wall 64 has a molded in place indent 63. An air bag 27 is folded and stored within the cover 26. The cover 26 has integrally molded legs 66 and 68 which define plastic runners 70 and 72 which provide a slide locking feature for seating within the slide locking channels 48 and 50 of the frame 24. This slide locking engagement between the cover 26 and the frame 24 is obtained by aligning the cover 26 and frame 24 end-to-end, and then sliding the runners 70 and 72 into the channels 48 and 50. As best seen in FIG. 6, the end wall 60 and legs 66 and 68 of the cover 26 cooperate to define an access opening 74. A similar access opening is provided between the lower end wall 62 and the legs 66 and 68.

Inflator 28 is a suitable commercially available inflator of cylindrical shape, and has a first end 78 which carries a threaded stud 80, and a second or lower blunt end 82.

As best seen in FIG. 6, the retainer strap 32 is of stamped steel construction and bent into a generally rectangular shape which will fit over the frame 24. In particular, the retainer strap 32 includes a base wall 86 having a round aperture 88 therein. A pair of laterally spaced strap walls 89 and 90 extend integrally from the base wall 86 and terminate with integral end flaps 91 and 92 which are bent to overlie one another, as shown in FIGS. 5 and 6. The end flaps 91 and 92, respectively, have a bifurcated configuration which defines open end slotted apertures 94 and 96.

After the cover 26 is slid into the frame 24, the retaining strap 32 is installed to lock the cover 26 and frame 24 against relative sliding movement. In referring to FIG. 6, it will be understood that the strap walls 89 and 90 may be bent away from one another to permit the retainer strap 32 to be installed within the grooves 42 and 44 of the frame 24 so that the rectangular shape of the retainer strap 32 encircles or encompasses the frame 24 and cover 26. The grooves 42 and 44 serve to position and retain the retainer strap 32 at the proper location. The inflator 28 is preferably slightly longer than the frame 24 so that the second or lower end 82 of the inflator 28 becomes encaptured within the aperture 88 of the base wall 86 of the retainer strap 32. The open slotted apertures 94 and 96 of the flaps 91, 92 permit the end flaps 91 and 92 to be hooked over the threaded fastener 80 of the inflator 28. As best seen in FIG. 5 the nut 30 is installed onto the threaded fastener 80 to fixedly attached the retainer strap 32 onto the frame 24, while simultaneously fixedly attaching the inflator 28 to the frame 24.

It will be appreciated that the inflator 28 may be installed into the module 20 either before or after the retainer strap 32 is positioned on the frame 24. Furthermore, the apertures 94, 96 in end flaps 91 and 92 need not be of the open end design shown in FIG. 6 if the module 20 is to be assembled by inserting the inflator 28 into the module 20 after the retainer strap 32 has already been placed into position. In addition, it will also be appreciated that the base wall 86 need not have an aperture 88, in which case the base wall 86 will engage against the lower end 82 of the inflator 28. Although the presence of the longitudinally extending grooves 42 and 44 advantageously locate the retainer strap 32, it will be understood that these grooves 42, 44 are not necessary if the retainer strap 32 hooks over both ends of the inflator.

Figure 3:
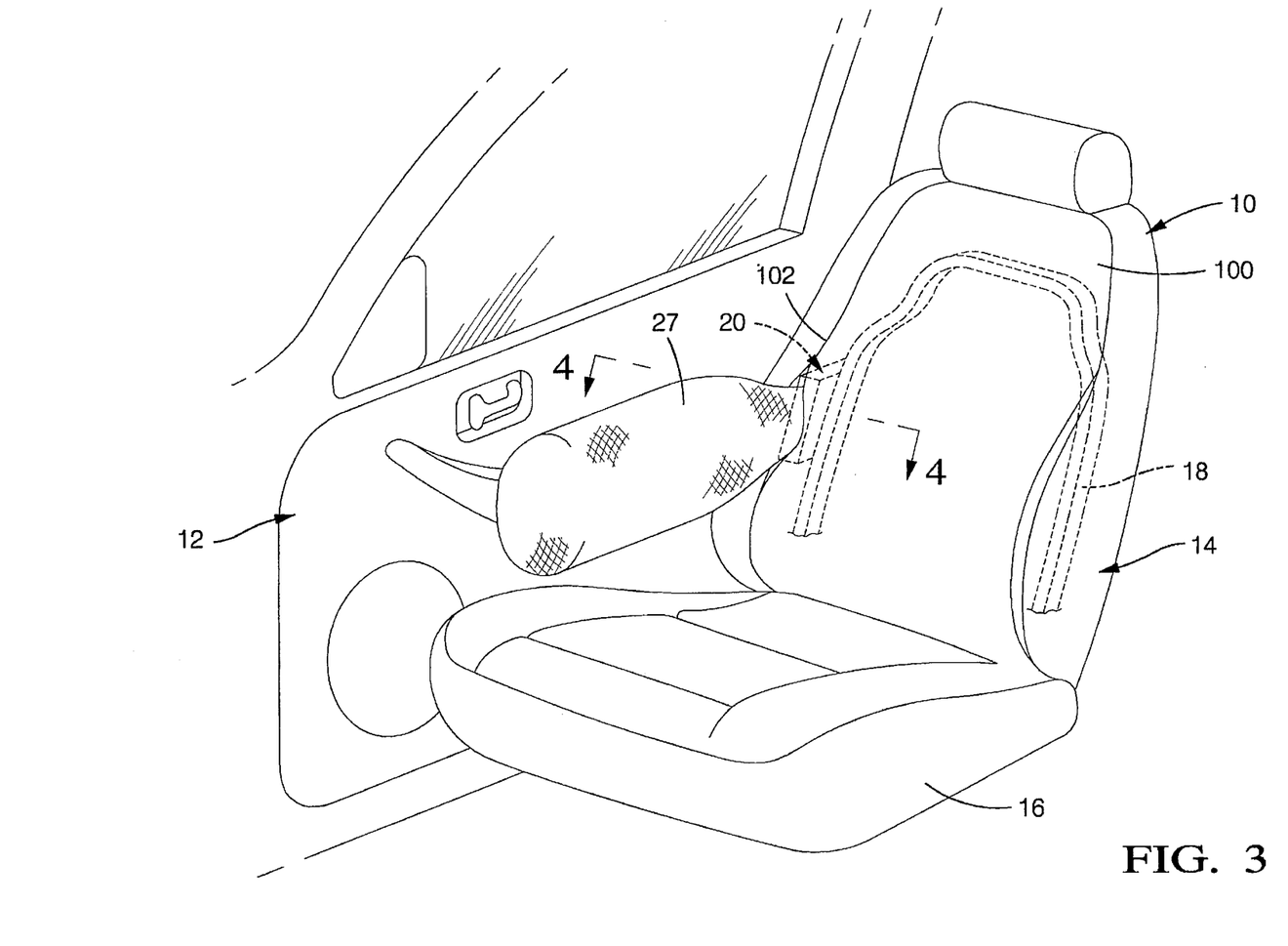
FIG. 3 is a perspective view similar to FIG. 1, but showing the air bag deployed to restrain an occupant.
Figure 4:
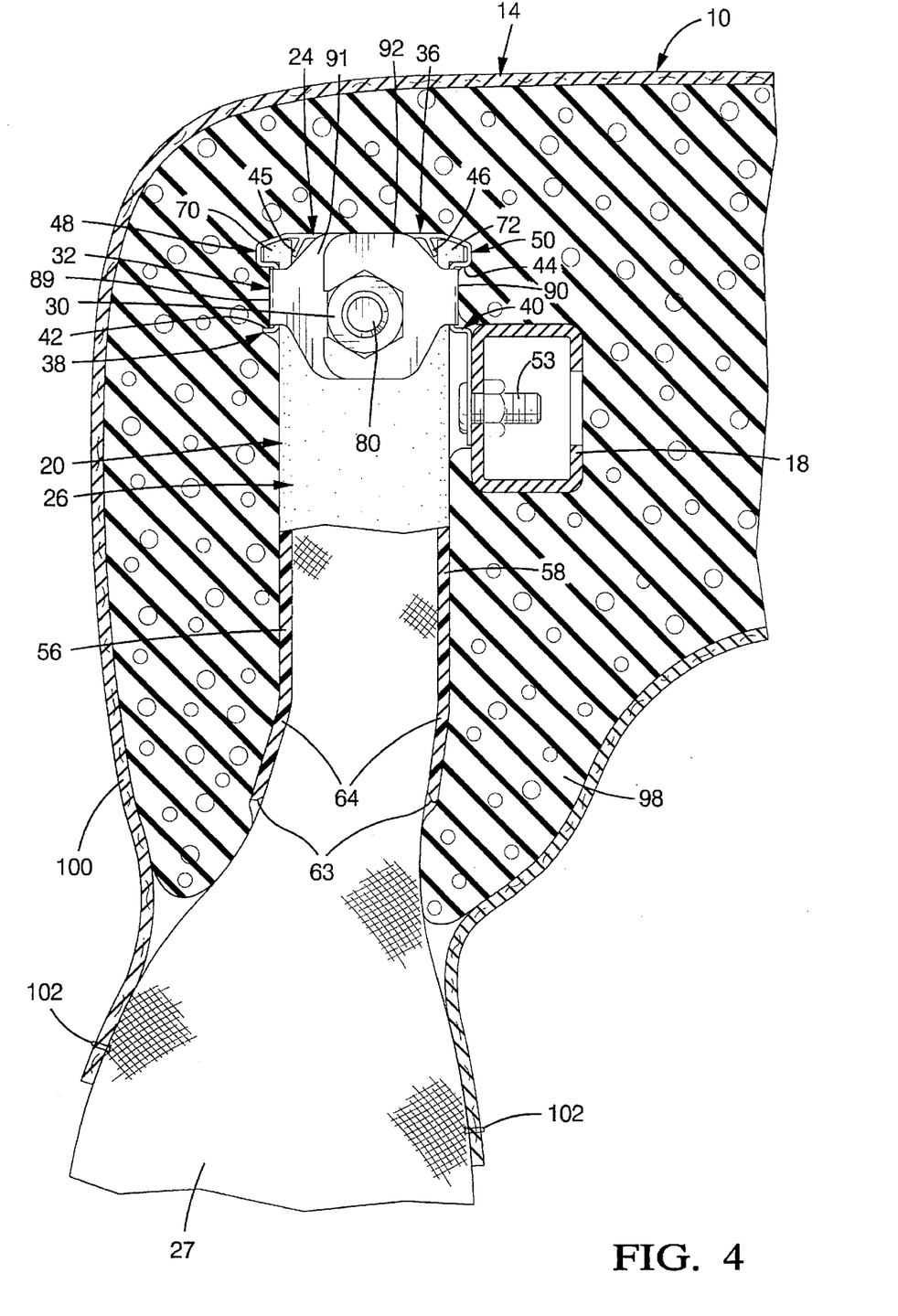
FIG. 4 is a section view taken in the direction of arrows 4—4 of FIG. 3.

FIG. 2 shows the module installed in the seat back and located within a foam cushion 98. The cushion is enveloped in a seat cover 100 which is stitched together at stitches 102. Upon activation of the inflator 28, the air bag 27 inflates and will burst through the foam 98 and break apart stitches 102 to obtain the deployed position of FIG. 3. Although it will be understood that the drawings show the air bag module 20 of this invention mounted on a seat back, 14 the module 20 can also be mounted on the seat bottom 16, on the door or elsewhere in the motor vehicle.

Figure 7:
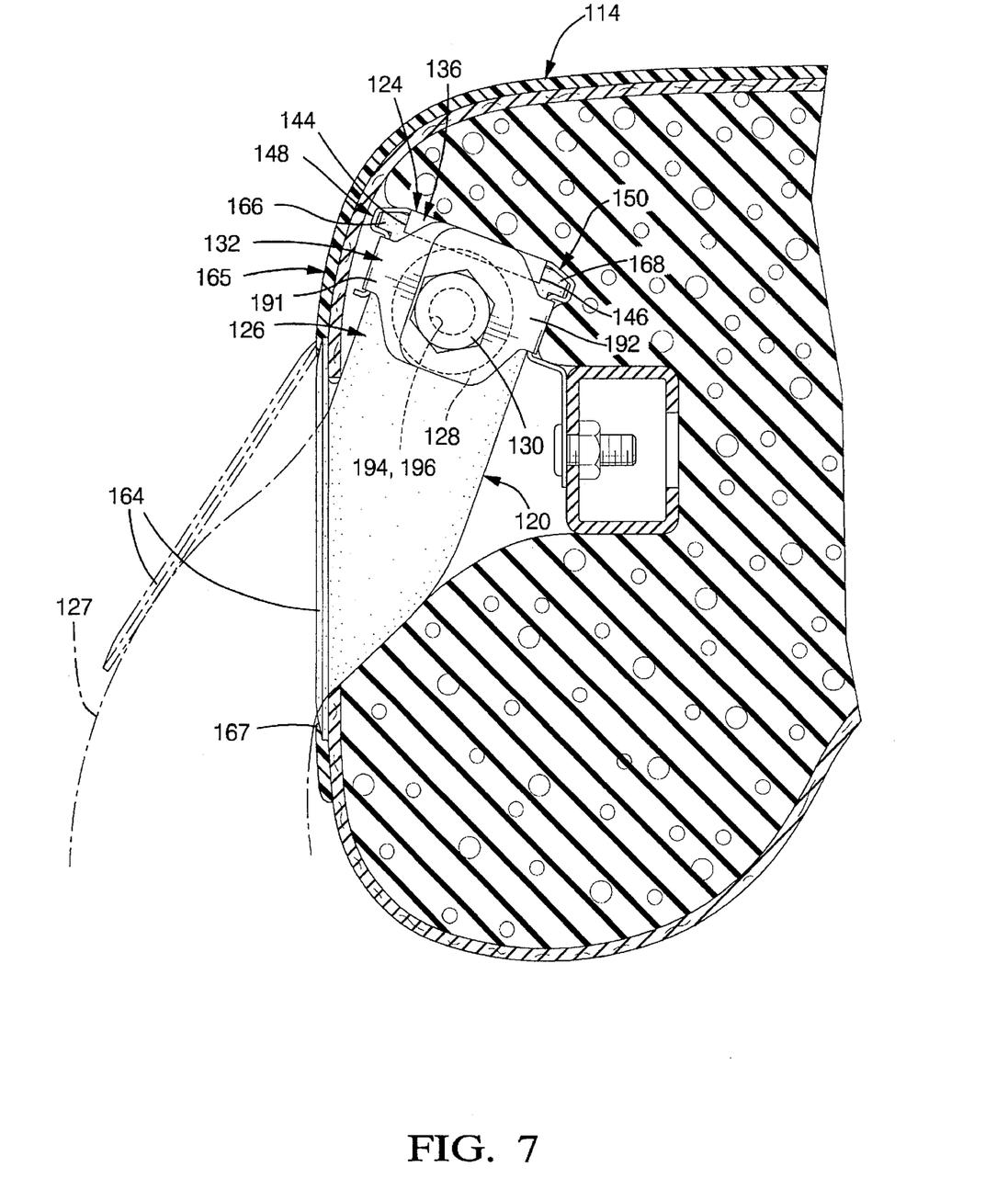
FIG. 7 is a section view taken through a seat back showing a second embodiment of the air bag module.
Figure 8:
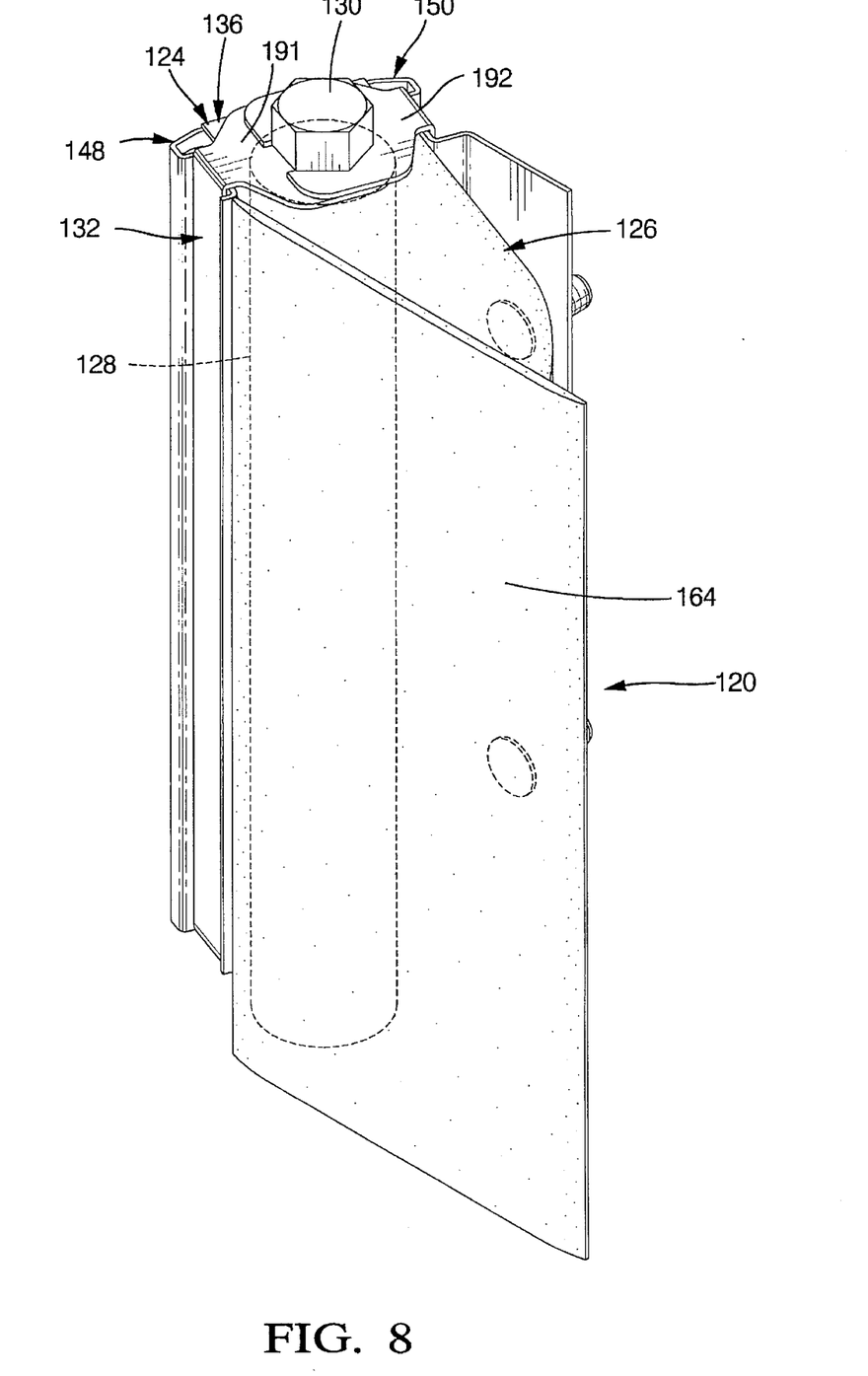
FIG. 8 is a perspective view of the air bag module of the second embodiment of FIG. 7.

FIGS. 7 and 8 show a second embodiment of the invention which includes a module 120 including a frame 124, a cover 126, inflator 128, a bolt 130, and retainer strap 132. As best seen in FIG. 7, the frame 124 is of stamped or roll formed construction and the base wall 136 thereof is deformed inwardly to provide shoulder walls 144 and 146 which define slide locking channels 148 and 150. The slide locking channels 148 and 150 slidably receive runners 166 and 168 provided on the cover 126.

The cover 126 has an integrally molded end wall 164 which is decoratively grained to match a decorative trim panel 165 provided on the seat back 114. The end wall 164 seats within a rectangular recess 167 of the trim panel 165. As seen in FIG. 7, the activation of the inflator to inflate the air bag 127 causes the air bag 127 to break the end wall 164 of the cover 126 so that the air bag 127 deploys outwardly of the seat back 114.

The inflator 128 is attached to the module 120 by installing a threaded bolt 130 through aligned apertures 194 and 196 of the end flaps 191 and 192 of the retainer strap 132. The inflator 128 has a threaded aperture for receiving the threaded bolt 130.

Figures 9, 10, 11:
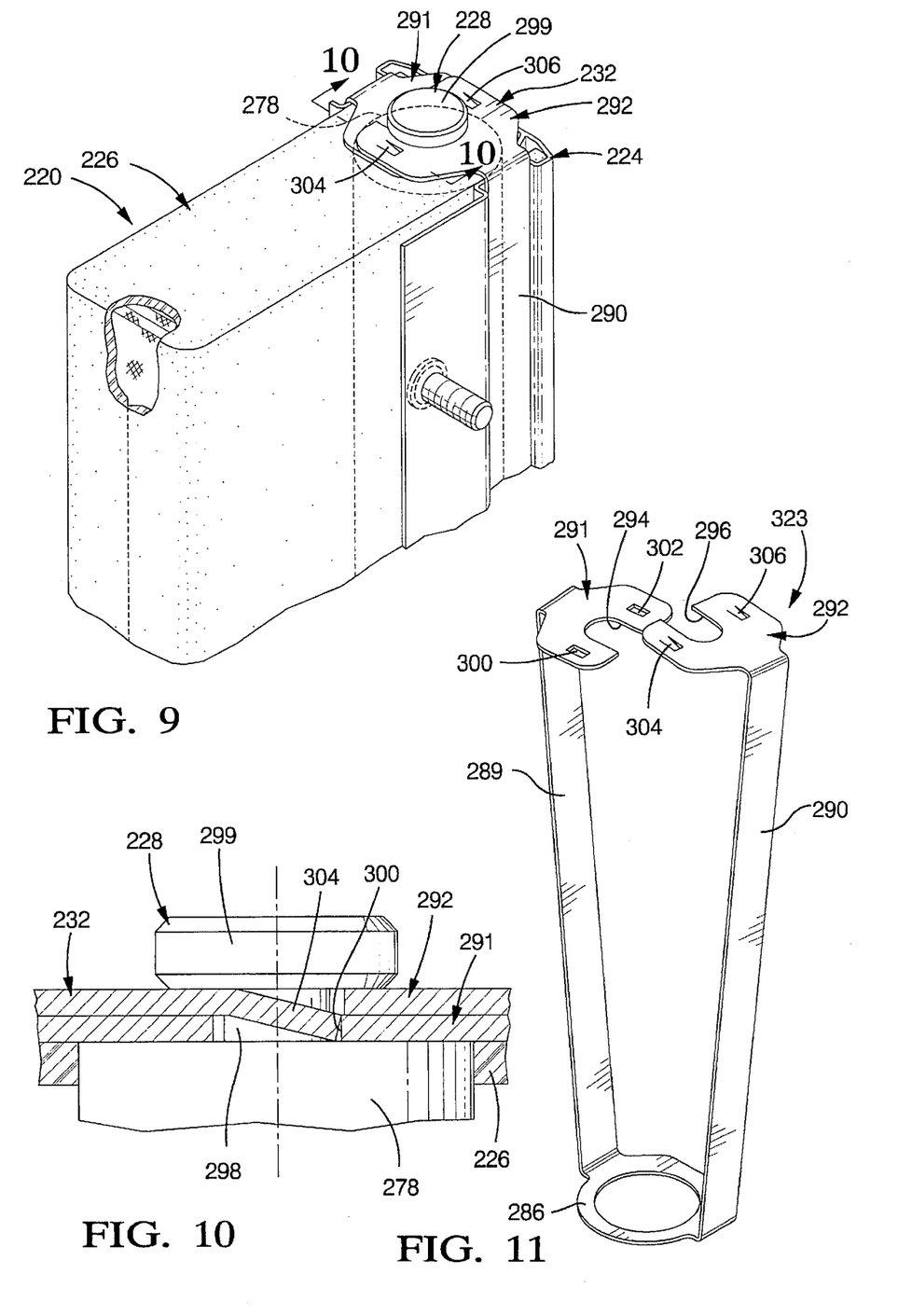
FIG. 9 is a perspective view showing a third embodiment of the air bag module.
FIG. 10 is a section view taken in the direction of arrows 10—10 of FIG. 9.
FIG. 11 is a perspective view of the retaining strap of FIG. 9.

FIGS. 9, 10 and 11 show a third embodiment of the invention which includes an air bag module 220 including a frame 224, a cover 226, inflator 228 and a retainer strap 232.

As best seen in FIG. 11, the retainer strap 232 includes a base wall 286 and a pair of laterally spaced strap walls 289 and 290 which extend integrally from the base wall 286 and terminate with integral end flaps 291 and 292. The end flaps 291 and 292 respectively have a bifurcated configuration which defines open end slotted apertures 294 and 296. As best seen in FIG. 10, the inflator 228 includes an upper first end 278 which carries a necked-down shank 298 and an enlarged head 299. As seen in FIG. 10, the shank 298 is slightly smaller in diameter than the width of the slotted apertures 294 and 296 of the retainer strap 232.

The end flap 291 of the retainer strap has a pair of apertures 300 and 302 which straddle the slotted aperture 294. The end flap 292 has a pair of tangs 304 and 306 struck therefrom. The air bag module 220 is assembled by installing the inflator 228 and then positioning the retainer 232 strap around the frame 224 so that the end flaps 291, 292 insert between the upper end 278 of the inflator 228 and the head 299 thereof with the end flap 292 overlying the end flap 291. The tangs 304 and 306 of the end flap 292 become seated within the apertures 300 and 302 of the end flap 291.

FIG. 11 shows the locked tabs 304 and 306 bent downwardly so that the locking engagement into the apertures 300 and 302 will occur automatically. Alternatively, the tabs 304 and 306 may be normally flush with the end flap 292 and then bent downwardly into the apertures 300 and 302 via appropriate tooling after the strap walls 289 and 290 have been wrapped around the module.

Thus, it is seen that the invention provides a new and improved air bag module of simplified light weight and economical construction, which is particularly suited for use in vehicle seats, doors or other locations within a motor vehicle.

The embodiments of the invention in which an exclusive property or privilege is claimed are defined as follows:

1. An air bag module comprising:
    a frame of channel shape cross section including a base wall and side walls extending integrally from the base wall;
    a cover of molded plastic construction for enclosing a folded air bag and adapted to be slid longitudinally between the side walls of the frame;
    first and second interfitting slide locking features provided respectively in the frame and the cover to interlock the cover to the frame when the cover is slid into the frame;
    a cylindrical inflator having first and second ends and adapted to be installed into the frame to inflate the air bag; and
    a retainer strap encompassing the frame to restrain the relative longitudinal movement of the cover relative the frame and being fastened to the inflator.

2. The module of claim 1 further characterized by a fastener installed between the first end of the inflator and the retainer strap, and the retainer strap having a base end being apertured to receive the second end of the inflator.

3. The module of claim 2 in which the inflator is longer than the frame so that the second end of the inflator extends outside the confines of the frame and the cover to be captured within the aperture of the base end of the retainer strap.

4. The module of claim 1 further characterized by a fastener installed to the first end of the inflator and the retainer strap having a base end adjacent the second end of the inflator, laterally spaced strap walls extending longitudinally along the inflator to the first end of the inflator, and a pair of apertured end flaps which overlap one another and are apertured to receive the fastener installed to the first end of the inflator.

5. The module of claim 4 further characterized by the fastener being a threaded stud and the end flaps being bifurcated so that the apertures are open end slots by which the end flaps may be slipped about the threaded stud.

6. The module of claim 1 further characterized by the retainer strap including laterally spaced strap walls extending longitudinally along the inflator, and the side walls of the frame having longitudinal extending grooves formed on the outside thereof to seat the strap walls of the retainer strap to locate and retain the retainer strap relative to the frame.

7. The module of claim 6 wherein the base wall of the frame includes flanges and in which the grooves formed in the side walls of the frame cooperate with the flanges to provide the slide locking feature of the frame.

8. The module of claim 1 in which the slide locking feature of the cover is defined by a runner structure which is integrally molded on the cover.

9. The module of claim 1 further characterized by the frame being of formed metal construction and having a shoulder structure integrally formed therein to define the slide locking feature of the frame.

10. The module of claim 1 further characterized by the cover having integrally molded break apart portions through which the inflating air bag deploys.

11. The module of claim 10 further characterized by the plastic cover being decoratively trimmed to close and open a decorative trim panel.

12. The module of claim 1 in which the retainer strap has free ends separable to permit installation of the retainer strap about the frame and a fastener acting to concomitantly attach together the free ends of the retainer strap and attach the inflator to the retainer strap.

13. The module of claim 12 in which the fastener includes the retainer strap having apertured end flaps overlapping one another and having a tang struck from one end flap to engage with a aperture of the other flap to attach together the free ends of the retainer strap, and the inflator includes a headed projection captured by apertured end flaps.

* * * * *